(No Model.) 7 Sheets—Sheet 1.

P. MALTBY.
REVERSING VALVE.

No. 333,419. Patented Dec. 29, 1885.

Witnesses.
H. W. Elmore.
Wm. J. Danner.

Inventor.
Philo Maltby.
By his Attorney.
J. R. Nottingham

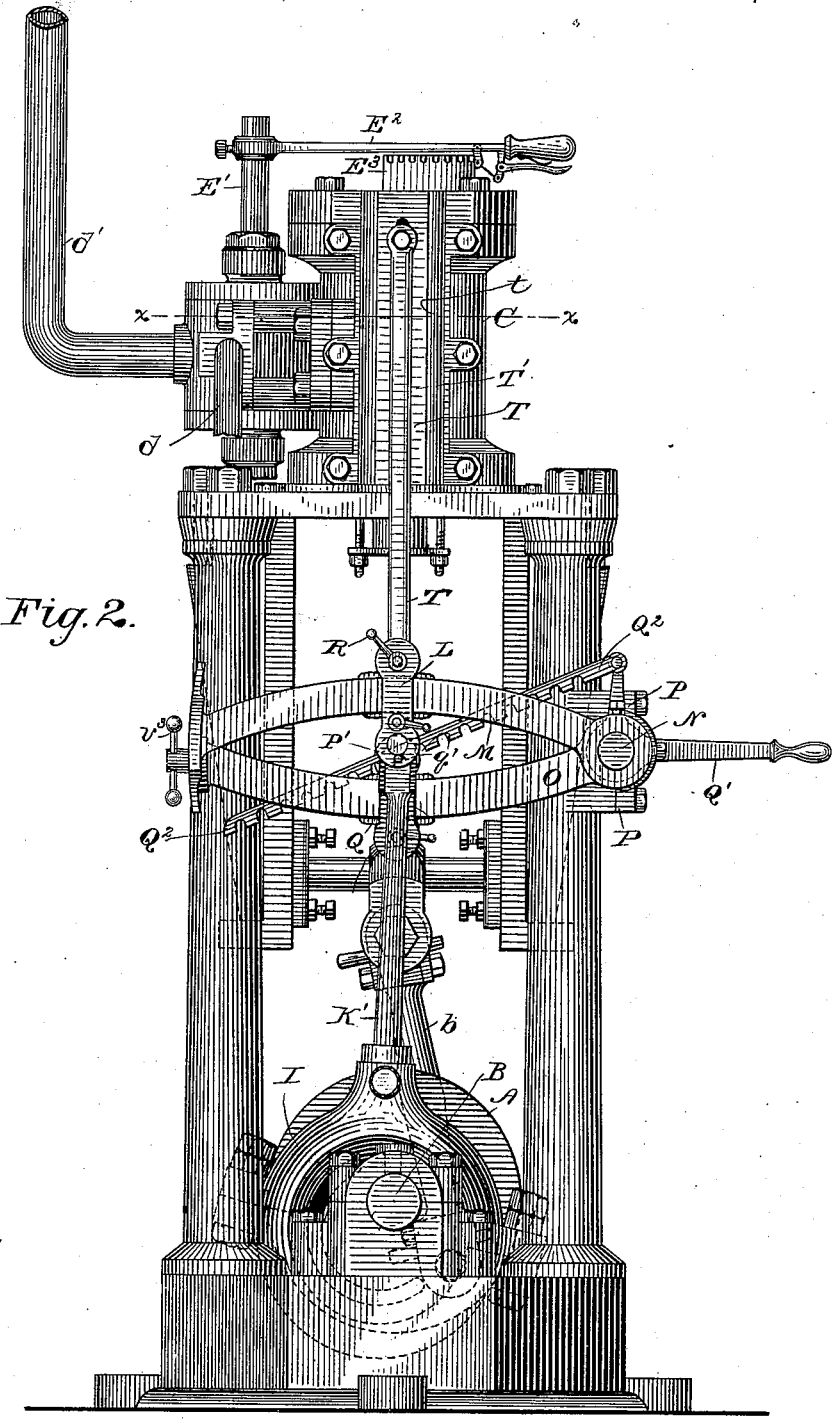

(No Model.) 7 Sheets—Sheet 3.
P. MALTBY.
REVERSING VALVE.
No. 333,419. Patented Dec. 29, 1885.
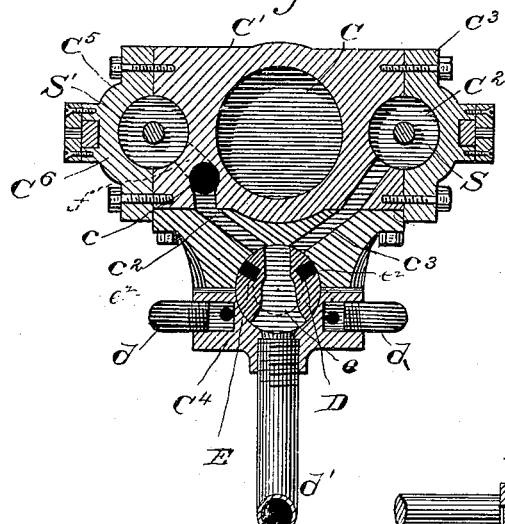
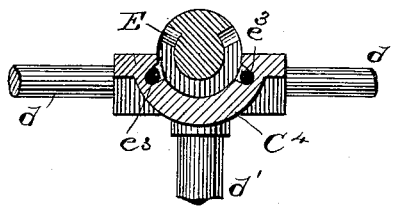
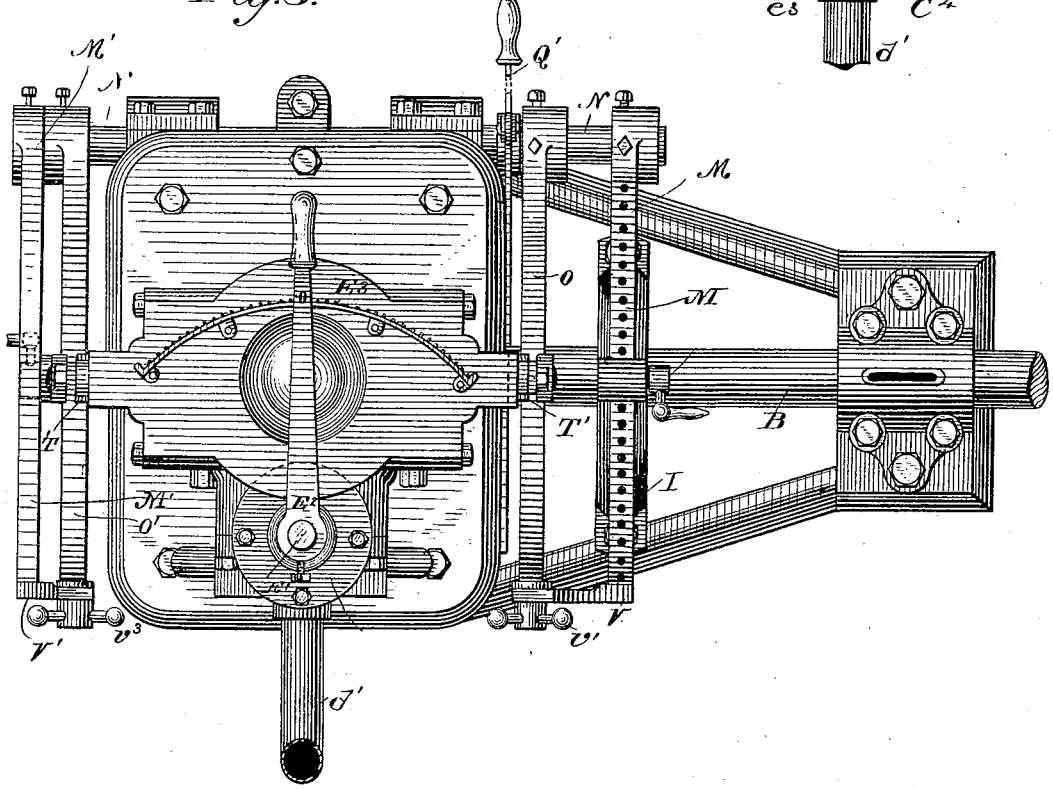
Witnesses
H. W. Elmore,
Wm. J. Panner
By his Attorney
J. R. Nottingham
Inventor
Philo Maltby (No Model.) 7 Sheets—Sheet 4.

P. MALTBY.
REVERSING VALVE.

No. 333,419. Patented Dec. 29, 1885.

Witnesses.
H. W. Elmore.
Wm. J. Panner.

Inventor.
Philo Maltby
By his Attorney,
J. R. Nottingham (No Model.) P. MALTBY. 7 Sheets—Sheet 5.
REVERSING VALVE.
No. 333,419. Patented Dec. 29, 1885.
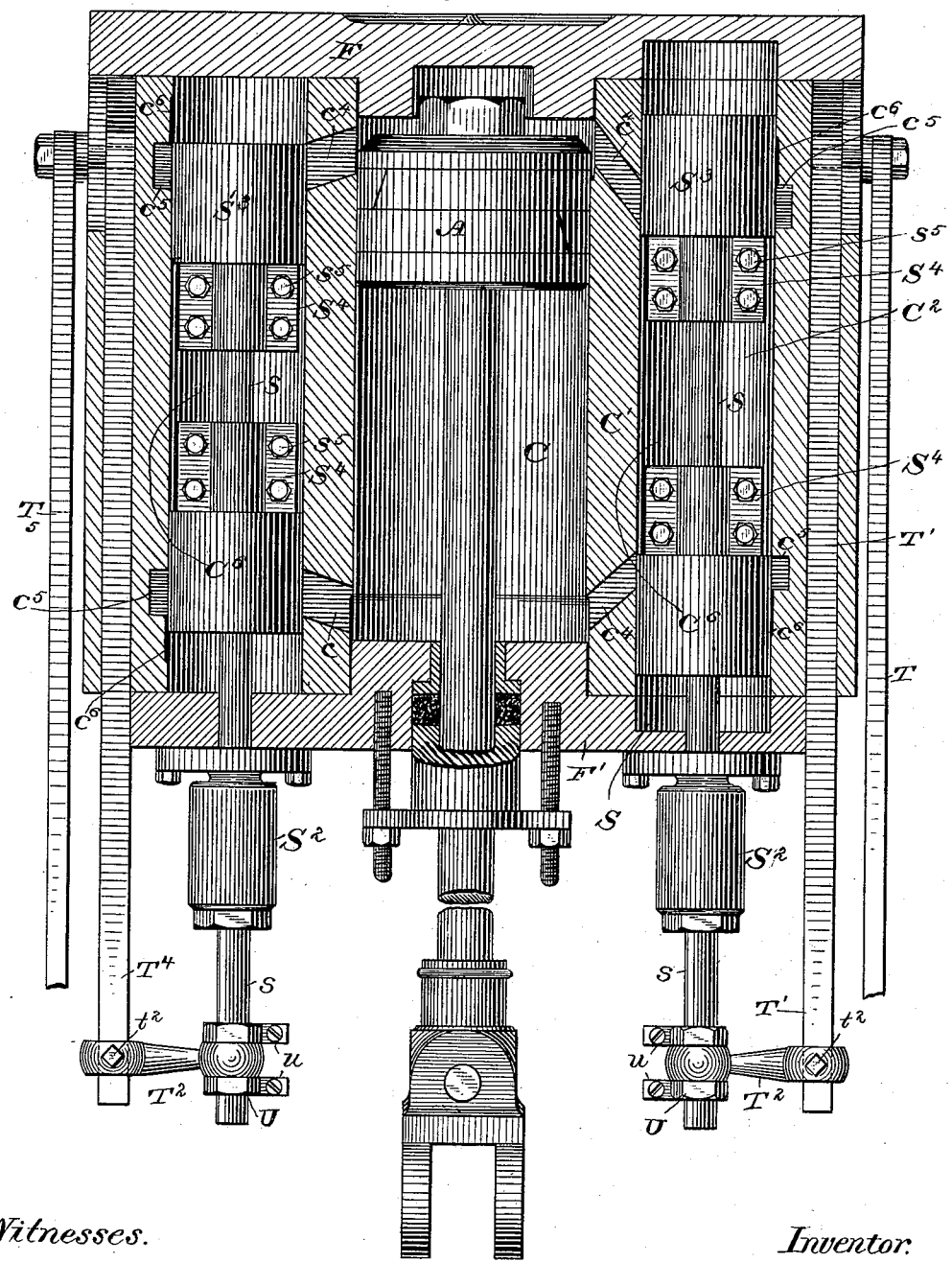
Fig. 8.
Witnesses.
H. W. Elmore,
Wm. J. Banner.
Inventor.
Philo Maltby.
By his Attorney.

(No Model.) 7 Sheets—Sheet 6.

P. MALTBY.
REVERSING VALVE.

No. 333,419. Patented Dec. 29, 1885.

Witnesses.
H. W. Elmore,
Wm. J. Tanner,

Inventor.
Philo Maltby.
By his Attorney.

(No Model.)  7 Sheets—Sheet 7.
P. MALTBY.
REVERSING VALVE.
No. 333,419.  Patented Dec. 29, 1885.
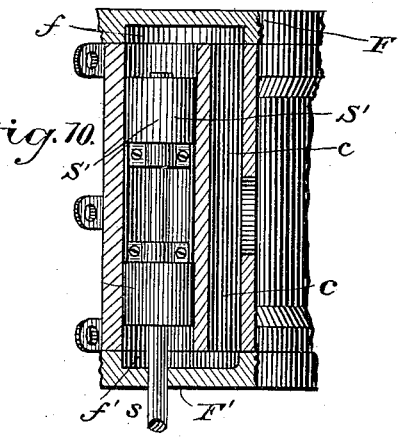
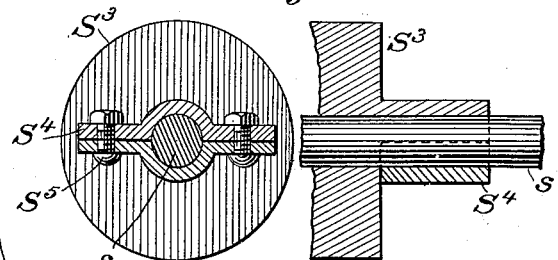
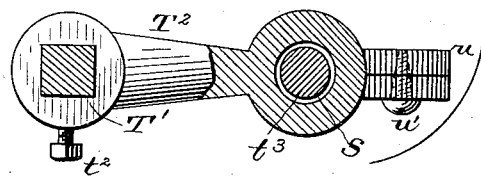
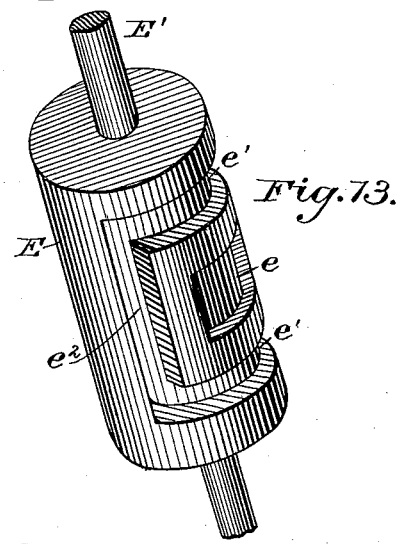
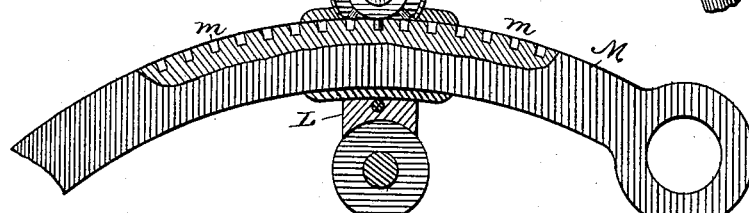
Witnesses  
H. W. Elmore,  
Wm. J. Panner.
By his Attorney  
J. R. Nottingham
Inventor  
Philo Maltby.

UNITED STATES PATENT OFFICE.

PHILO MALTBY, OF CLEVELAND, OHIO, ASSIGNOR OF TWO-THIRDS TO L. G. HINE, OF WASHINGTON, DISTRICT OF COLUMBIA, AND FRANK D. MALTBY, OF NEW YORK, N. Y.

REVERSING-VALVE.

SPECIFICATION forming part of Letters Patent No. 333,419, dated December 29, 1885.

Application filed June 9, 1885. Serial No. 168,107. (No model.)

*To all whom it may concern:*

Be it known that I, PHILO MALTBY, a citizen of the United States, residing at Cleveland, in the county of Cuyahoga and State of Ohio, have invented certain new and useful Improvements in Reversing-Valves, of which the following is a specification, reference being had therein to the accompanying drawings.

This invention relates to certain improvements in reversing-valves for steam-engines; and it is particularly adapted and designed for that class of engines known as "marine propellers," although it is applicable to other engines in which it is required to reverse the motion. In this class of engines as heretofore constructed the reversing mechanism has consisted of the usual link-gearing, requiring double eccentrics and eccentric-straps and valve-actuating mechanism, which renders the valve-shifting mechanism extremely complicated and expensive.

My invention has for its object to provide for quickly reversing the engine or stopping the same by means of a single valve, thereby dispensing with the complicated mechanism heretofore found necessary for the purpose.

Figure 1:
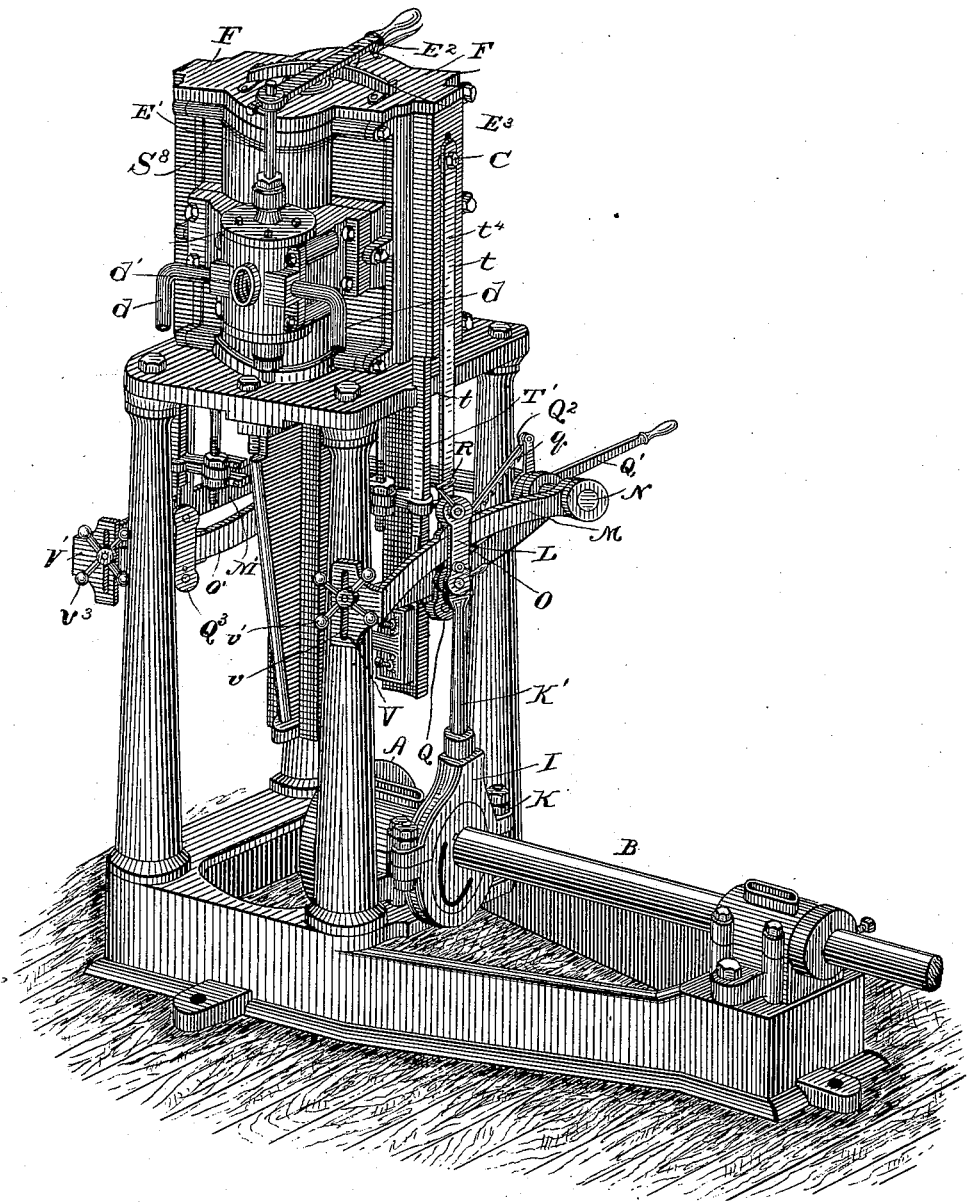
Figure 6:
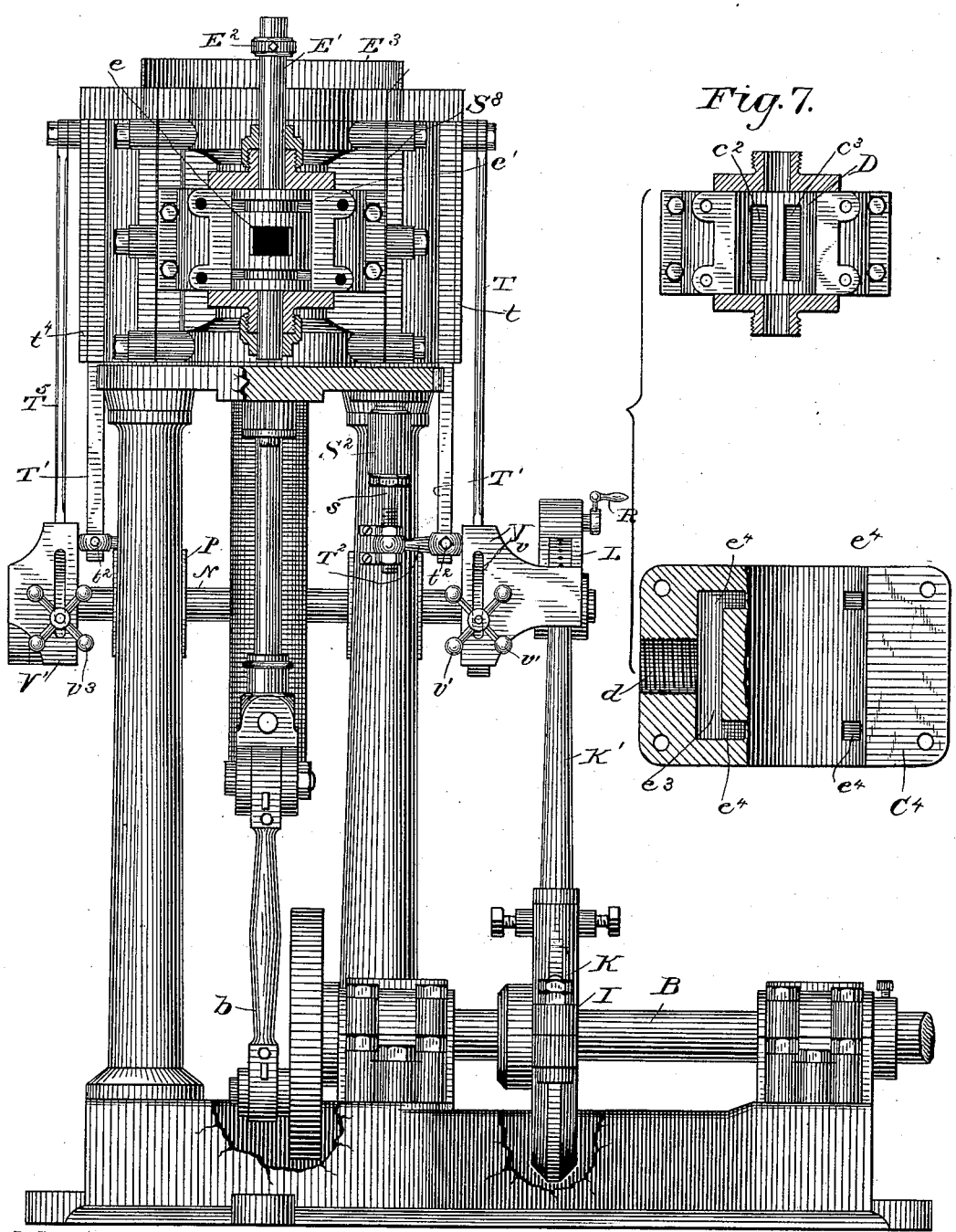
Figure 7:
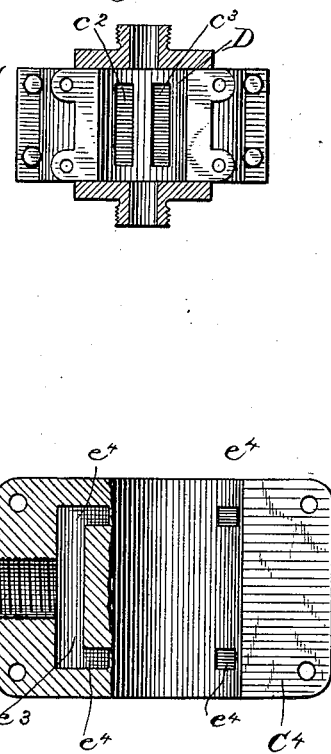
Figure 9:
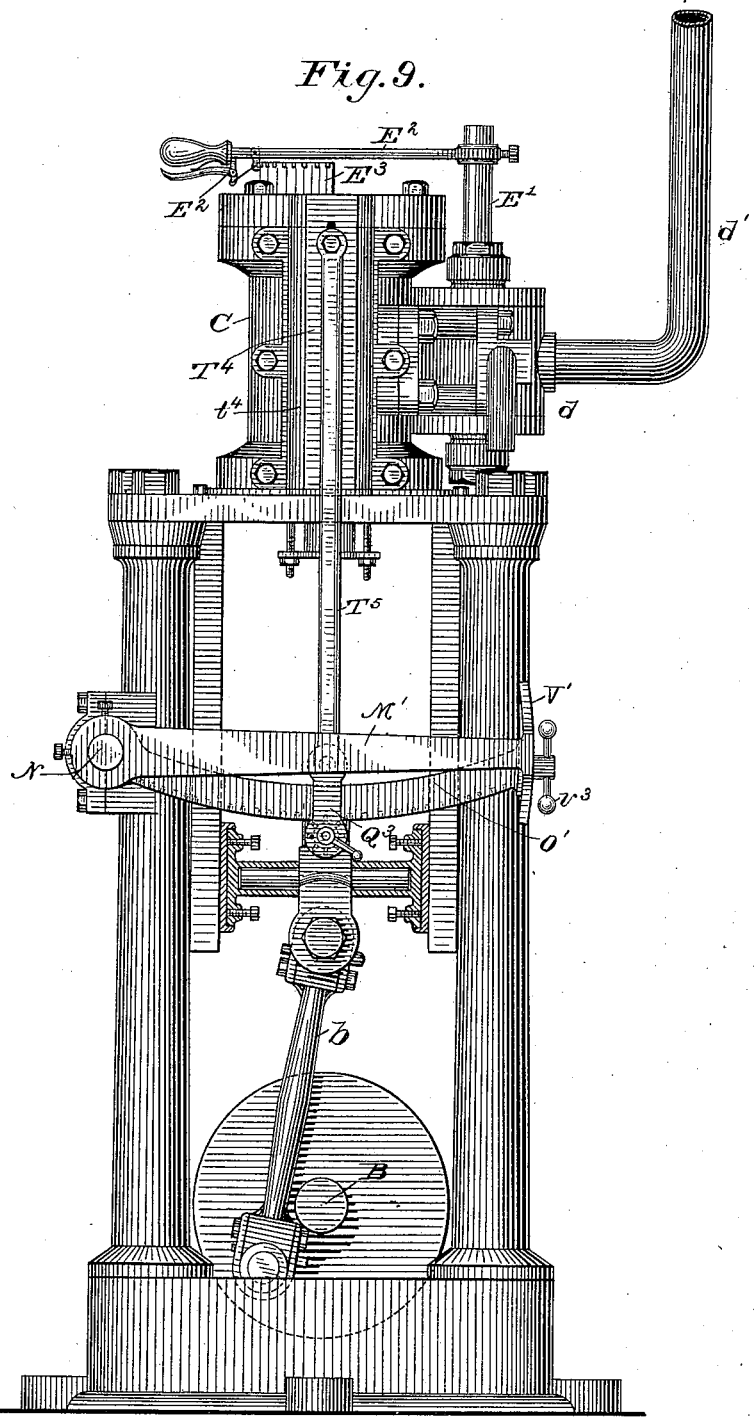

In the accompanying drawings, Figure 1 represents a perspective view of my improved engine entire: Fig. 2, an end elevation of the same; Fig. 3, a horizontal sectional view taken on the line $x\ x$ of Fig. 2; Fig. 4, a detached horizontal sectional view of the feed-valve and a portion of its valve-casing; Fig. 5, a top view of the engine, showing the lever and segment for regulating the position of the feed-valve. Fig. 6, a side elevation of the engine, showing the outer portion of the casing of the feed-valve removed and the said valve in position to stop the motion of the engine; Fig. 7, detached views of portions of the feed-valve chest, showing the ports leading from the same; Fig. 8, a vertical sectional view of the engine-cylinder and its valve-chests and valves; Fig. 9, an end elevation of the engine, taken opposite to the elevation shown in Fig. 2 of the drawings; Fig. 10, a detached sectional view showing the valve-chest arranged to take the live steam at its ends; Fig. 11, a detached sectional view of a connection or clamp, whereby the valve-rod is connected with a reciprocating guide-rod; Fig. 12, a detached view of the clamps on the valve-rod; Fig. 13, a detached perspective view, partly in section, of the feed-valve, showing the ports of the same; and Fig. 14, a detached side view of one of the segment-levers and its valve-connecting mechanism, whereby provision is made for changing the lead and throw of the induction and eduction valves of the engine.

Referring to the drawings, A designates the piston, and B the main shaft, the two having the ordinary crank-connections, $b$. The piston works in a cylinder, C, formed in a body, C', supported by standards upon a base, which also forms a journal-bearing for the main shaft B. These parts, except the body C', are of ordinary and approved construction. The body C', by cap $C^3$, forms upon one side of the cylinder a valve-chest, $C^2$, and upon the other side of the cylinder, by caps $C^5$, a valve-chest, $C^6$. In one side face of the body, by a cap, $C^4$, is formed a chamber, D, which receives the reversing-valve E.

Formed in the cylinder-body C' is a vertical steam-chamber, $c$, which connects with the valve-chamber D upon one side by a central port, $C^2$, and with the valve-chest $C^6$ upon the other side by ports $f$ and $f'$, which extend through the caps F and F', respectively, above and below, as seen in Fig. 10. A central port, $c^3$, connects the valve-chest D with the valve-chest $C^2$, and each of the valve-chests is connected with the cylinder above and below by ports $c^4$, Fig. 8.

Seated within the chest D is the valve E. This valve is both a throttle feed and reversing valve. It is formed with a central exhaust-port, $e$, the rear area of which is slightly larger than the seat between the ports $c^2\ c^3$, so as to exhaust from both simultaneously when the engine is not working and relieve the parts from strain. In its face is also formed a rectangular recess, which serves as a passage for live steam. It is composed of two horizontal ports, $e'$, connected by vertical ports $e^2$, and these ports have no connection with the exhaust. The ports $c^2$ $c^3$ are so arranged relatively to the valve-passages $e'$ $e^2$ that when the exhaust-port $e$ is in the position shown in Fig. 3 there is no connection from the said live steam passages to either of the valve-chests. The live steam is inducted through one or other of opposite pipe-connections, $d$, and by means of vertical and horizontal ports $e^3$ $e^4$ into the valve-passages $e'$ $e^2$, and the exhaust-port $e$ has a flaring mouth, which insures its registration with an exhaust-port, $d'$, whatever may be the adjusted position of the valve. The stem $E'$ of the valve E extends up through the casing, and carries a ratchet-lever, $E^2$, which, engaging with a toothed segment, $E^3$, allows the valve E to be conveniently set in three positions—namely, first, in the center to shut off the live steam and stop the engine, as seen in Fig. 3; second, to throw the live steam into the valve-chest $C^2$, through the port $c^3$, to start the engine ahead; and, third, to throw the live steam into the valve chest $C^6$, through the port $c^2$, to reverse the engine.

It will be observed that when the live steam is thrown into the valve-chest $C^6$ it enters said chest at both ends by passing through the ports $f$ $f'$ from the vertical chamber $c$, and the exhaust is carried on from the center of the valve-chest $C^2$ through the ports $c^3$ $e$ $d'$. When, however, the engine is running reversely, the live-steam is inducted into the center of the valve-chest $C^2$, and is exhausted from the ends of the chest $C^6$ through the ports and passages $f$ $f'$, $c$ $c^2$, $e$, and $d'$.

I attach importance not only to the simplicity and efficiency of this mechanism for starting, stopping, and reversing the engine by the proper manipulation of a single valve, but also, and more particularly, to the convenience with which the change can be wrought as contradistinguished from the two valves ordinarily used for a cut-off. The valve S operates in the chest $C^2$ and the valve $S'$ in the chest $C^6$. Both these valves S and $S'$ are, by mechanism yet to be described, thrown simultaneously in the same direction, but one at a greater speed than the other, as will presently appear. The ports $c^4$ are differently inclined, as seen in Fig. 8, so that while their openings into the cylinders are upon the same respective planes their openings within one valve-chest are much nearer together than in the other chest. This is made necessary in order to admit the steam into the ends of the valve-chest $C^6$.

I move my exhaust-valve the fastest, and, instead of giving this valve a lead in order to promptly get rid of dead steam, I am enabled to set my valves alike, and by giving a quicker motion to the exhaust-valve I provide for the proper exhaust without even enlarging the exhaust-ports. When the ports $c^4$ are closed by the valves S $S'$, the pressure from the cylinder would act strongly against the valve to force it over to the side of its seat farthest from the cylinder. I provide to balance the valves from this pressure by forming in the walls of the chests opposite each port $c^4$ a blind port, $c^5$, of the same area as the port $c^4$; and to each of these blind port $c^5$ is led toward the ends of its chests a shallow way, $c^6$. Hence, when the valve head or plug covers a port, $c^4$, the pressure from the cylinder is balanced by steam in the blind ports $c^5$, which is admitted through the way $c^6$, and, as the plug uncovers either port $c^4$, it also uncovers an equal area of the blind port $c^5$. If the area of each blind port is slightly greater than that of the port $c^4$ opposite, the effect will be to hold the valve to the port with a gentle influence sufficient to cause efficient working. The valve-rods $s$ $s$ of the valves S $S'$ work through separate stuffing-boxes $S^2$, which may be adjusted upon the cap $F'$ to compensate for wear between the valve and its seat, the several holes being made larger than the contained bolt or rod for that purpose. The piston-heads $S^3$ are adjustable upon the rods $s$ by a clamp-nut, $S^4$, one half of which is made integral with the piston-head and the other loose, and secured thereto by bolts $S^5$. By this means the nut $S^4$ may be loosened by simply unscrewing the bolts $S^5$, in contradistinction to solid nuts, which, if rusted in their threads, have to be forcibly loosened in order to move the head. The same construction may be used with the threads omitted.

I provide each of my caps $C^3$ $C^4$ $C^5$ with a peculiar packing, which consists of several sheets of very thin metal, as brass or copper. These sheets are placed between the caps and their seats upon the body $C'$, and when it is desired to take up lost motion or wear of the valves S $S'$ or E, I loosen up the bolts and take out one or more of the sheets. The sheets are marked $S^8$.

I will now briefly describe the means which I employ for varying the feed and exhaust at will. These means *per se* will be made the subject-matter for a separate application, and are only shown and described in this application to make the relation and advantages of the other parts of the engine clear.

Secured upon the shaft B is an eccentric, K, having a strap, I, which by a rod, $K'$, is connected to a block, L, adapted to be moved along in either direction upon a radius-arm, M, by a crank and toothed disk, R, journaled in the block L, and having its teeth or pins $r$ engage a series of holes or recesses, $m$, formed in the upper edge of said radius-arm. The arm M is rigid with a rock-shaft, N, journaled in bearings P, and this rock-shaft extends along the engine and projects beyond the line of its front, where it carries a straight arm, $M'$, corresponding with the radius-arm M, and hung rigidly upon the shaft. As the shaft B revolves, the arm M, through the block L and its eccentric connections, is given regular motion with the rock-shaft N for a center.

Loosely hung upon the rock-shaft N, adjacent to the radius-arm M, is a radius-arm, O, which carries a block, Q, the said block being connected by a pitman, T, with a sliding plate, T', moving in guides $t$, formed upon the rear of the engine. At the lower end of the slide T' is adjustably secured an arm, $T^2$, which embraces the guide at one end, and is secured thereto by a set-screw, $t^2$, and at the other end has a hole, $t^3$, through which is projected the lower end of the stem $s$ of the valve S'. The hole $t^3$ in the connecting-arm $T^2$ is slightly larger than the valve-stem $s$, and said stem and arm are held together by peculiar clamp-nuts U, having lugs $u$, which are held adjustably together by screws $u'$. The free end of the valve radius O operates through a slot, $v$, formed in the end plate, V, carried upon the end of the radius-arm M, and a clamp or screw, $v'$, allows the end of the valve radius O to be adjusted in the plate V at will. The block Q may be moved along on the valve radius O by an elbow-lever, Q', loosely hung on the shaft N, and having secured to its vertical arm a toothed rod, $Q^2$, the teeth $q$ of which engage a horizontal bolt or pin, $q'$, in the block and allow the said block to be moved in either direction.

To operate the valve S', which is located at the front of the engine, I employ a similar slide, $T^4$, moving in guides $t^4$, which, by a block, $Q^3$, is adjustably connected by a link, $T^5$, to a valve radius, O', hung loosely on the shaft N, and having its free end working loosely in a slot in the plate V', carried on the straight arm M', and adjustably set therein by a set-screw or clamp, $v^3$. Now, it will be observed that greater or less throw may be given the valves by moving the blocks L upon the arms M. It will also be seen that by moving the block Q on the valve radius O and block Q on the valve radius O' I can further adjust the feed or exhaust at will; but in case the range of such adjustments are not sufficient, and I find them insufficient for all the purposes of this invention, I have a still further adjustment in the means $v'$ $v^3$ in the plates V V', which allows the throw of the valve's radius-arms O and O' to be adjusted independent of the action accruing from the rock-shaft and its arms M M', and by this means I can at a moment's notice change the lead of the valve.

In practice, and running at a speed of, say, one hundred revolutions per minute, a proper adjustment of the exhaust will prevent pounding; but that adjustment will not prevent pounding if the speed is quickened to, say, four hundred revolutions per minute. I allow the engineer to adjust both the lead and the exhaust so as to use dead steam as a cushion, and by a slight manipulation of the parts described to so regulate the exhaust as to instantly meet any emergency which may follow a change of speed. If the engine labors, he may readily increase its exhaust; if it pounds, he may quickly choke the exhaust, all being done while the engine is running.

While I prefer to cushion the piston with exhaust-steam, it will be obvious from my construction that I may adjust to use live steam for this purpose, if it should be desirable.

The operation of the engine will be apparent to those skilled in the art.

I have in this application illustrated and described a complete engine according to my invention. The valve-gear, however, is claimed in a separate application, filed November 7, 1885, Serial No. 182,116.

Having thus described my invention, what I claim, and desire to secure by Letters Patent, is—

1. In a steam-engine having valve-chests arranged one upon each side of the cylinder, a single throttle feed-valve, and means for operating it to start, stop, or reverse the action, and valves working in said chests actuated by a single eccentric, whereby when live steam is fed through one chest the exhaust is being carried on through the other, as set forth.

2. A steam-engine having a valve-chest upon opposite sides of its main cylinder, and steam-ports arranged to lead the live steam to the ends of one of such chests, or to the center of the other, according to the position of a single throttle feed-valve, and valves, as S S', operating in said chests to feed live steam through one chest while the exhaust is being carried on through the other, as set forth.

3. In an engine, substantially as described, a throttle feed-valve, as E, having a continuous live-steam passage, as $e'$ $e^2$, and an exhaust-passage, $e$, passing centrally through the valve within the limits of the steam-passage $e'$ $e^2$, as set forth.

4. In an engine, substantially as described, the combination, with the valve-chest D, having steam-ports $c^2$ $c^3$, of the valve E, having passages $e'$ $e^2$, and exhaust-passages $e$, slightly larger than the seat between the said ports $c^2$ $c^3$, whereby when the live steam is cut off the cylinder exhausts from both sides, as set forth.

5. In a steam-engine, substantially as described, the cylinder-body C' and caps $C^3$ $C^4$ $C^5$, arranged to form valve-chests $C^2$ $C^6$ D, having port $c^3$, connecting the valve-chest with the central portion of valve-chest $C^2$, the vertical chamber $c$, the port $c^2$, connecting the said chamber with the chest D, ports $f$ $f'$, leading therefrom to the ends of the chest $C^6$, and ports $c^4$, connecting both valve-chests $C^2$ $C^6$ with the cylinder, all adapted to serve with a single throttle feed-valve and with valves S and S', as set forth.

6. The combination, with the cylinder-body C' and caps $C^3$ $C^4$ $C^5$, arranged to form valve-chests $C^2$, $C^6$, and D, of the packing $S^8$, formed of thin sheets of soft metal clamped between the caps and body at their bearings, as set forth.

In testimony whereof I affix my signature in presence of two witnesses.

PHILO MALTBY.

Witnesses:
   J. R. NOTTINGHAM,
   WILLIAM FITCH.